July 4, 1967 W. ARNOLD ET AL 3,329,264
ELECTROSTATIC SEPARATION OF LONG FROM SHORT FIBERS
Filed June 19, 1964 2 Sheets-Sheet 1
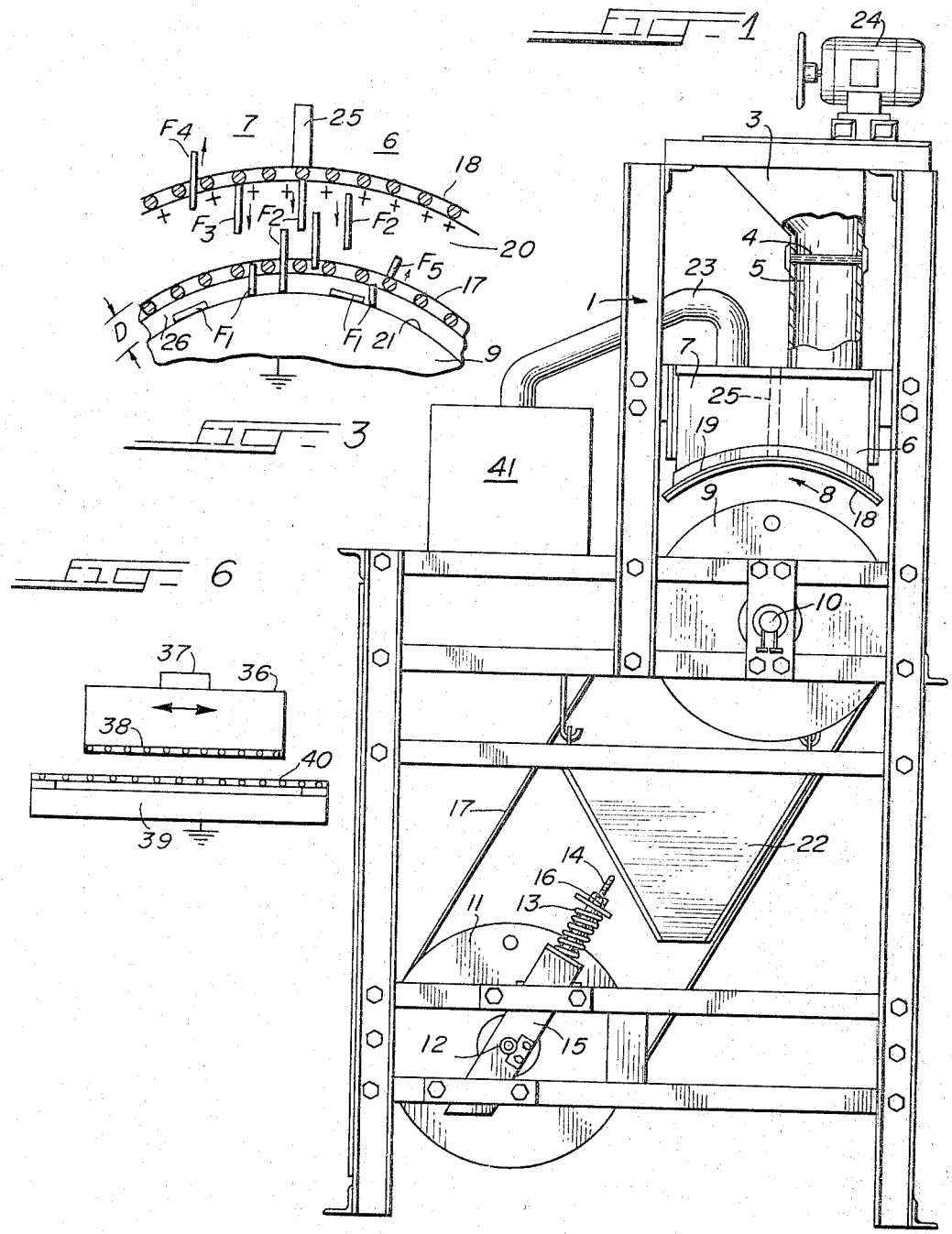
INVENTORS.
WALTER ARNOLD
KARL OSTERTAG

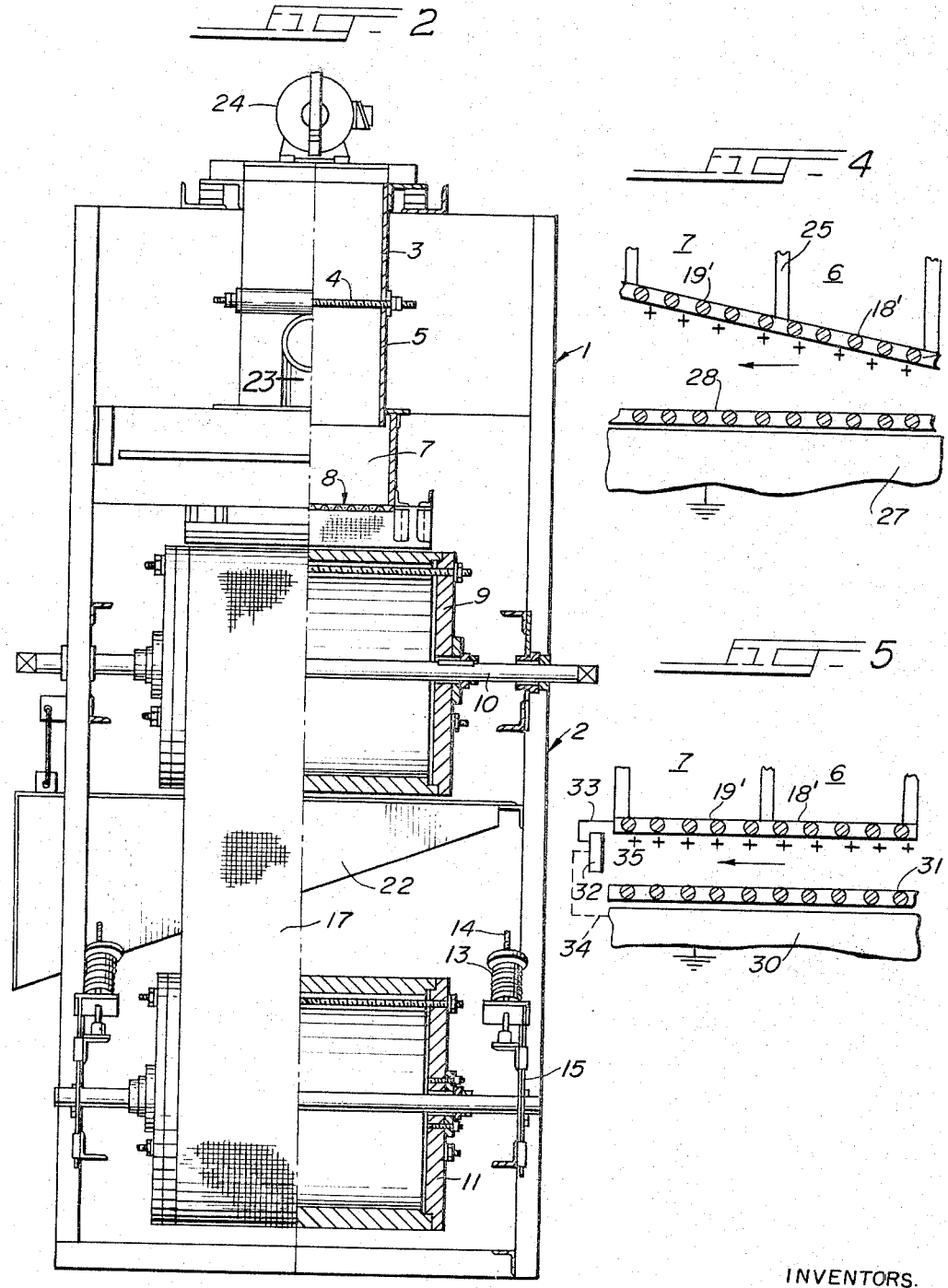

United States Patent Office 3,329,264
Patented July 4, 1967

3,329,264
ELECTROSTATIC SEPARATION OF LONG FROM SHORT FIBERS
Walter Arnold, Heinsberg, Rhineland, and Karl Ostertag, Oberbruch, Rhineland, Germany, assignors to Vereinigte Glanzstoff-Fabriken AG., Wuppertal-Elberfeld, Germany
Filed June 19, 1964, Ser. No. 376,385
Claims priority, application Germany, June 24, 1963, V 24,217
15 Claims. (Cl. 209—128)

The invention relates to a process for sorting of fibers of any textile fiber material.

The production of velvety, flocked surfaces with the aid of the electrostatic field is generally known. Very short flocks, whose length sometimes is considerably under a millimeter, are used. For reasons easily apparent to the average specialist in the field, considerable difficulties arise with respect to the maintenance of uniform lengths in the cut flocking fibers. Despite all endeavors, it is unavoidable that the cut fibers vary so greatly in length that a sorting out is absolutely necessary. In the usual sorting processes, which were all of mechanical nature, considerable difficulties, however, still remained, and it was not possible with any of the known processes to attain sortings with uniform classifications of fiber lengths. The screens used moved in such a way that a horizontal movement was super-imposed with a vertical, reciprocating motion. The fibers of a length shorter than the screen openings were to slip through the screen while the longer fibers remained on the screen. It often happened that a considerable portion of the individual fibers would stand up and, despite greater length than the predetermined sorting length, fell through the screen openings.

This nonuniformity in sorting, which manifests itself especially in the unsightly appearance of the flocked surface composed of said fibers, is completely eliminated by the process according to the invention.

The invention is based on the physical fact that the passages through a perforate, grounded conductor, e.g., a grounded screen, in an electrostatic field on one side of the screen is free of the field, as is the area behind the screen. From electrostatic flocking, it is known that the fiber flocks in the electrostatic field jump from one condenser plate to the other, striking them with their longitudinal axes perpendicular to the condenser surfaces, receive the charge of the surface and again jump to the oppositely charged plate, and so on in constant repetition.

It was now found that both physical facts, in themselves known, combined according to the teaching of the invention lead to an entirely faultless and practically 100% uniform sorting of the flock material. The process of the invention is characterized by the feature that the fibers, accelerated in the electrostatic field, strike against a Faraday cage having a grounded screen. The distance between the outer edge of the screen and the surface of a condenser plate lying behind said screen, measured in fiber impact or movement direction, approximately determines the maximum length of the shorter fibers to be separated from the longer fibers. The longer fibers, protruding beyond the surface of the screen of the Faraday cage, in repeated moving back and forth, are laterally displaced. Consequently, they may be made to enter a chamber arranged directly beside the fiber flock supply source and can be collected or drawn off through this chamber.

One of the two spaced, condenser plates building up the electrostatic field is a screen bottom of a fiber flock supply member, e.g., a flocking box, which in a manner known per se allows the emergence of a relatively uniform amount of fiber flock. The other condenser plate is spaced from this screen bottom at a suitable distance and is covered by a metal screen conductively connected with the plate. This screen and plate are spaced apart so that the distance from the remote surface of the metal screen to the surface of the condenser plate corresponds to the length of the fiber flocks to be sorted out. Further, besides the screen bottom of the container, preferably at the same level or spacing, a second screen bottom is provided, which screen is the perforated bottom of a zone connected to a suction device, whereby the longer fibers carried by the screen to this zone are pulled off through the second screen bottom by the suction device.

In a preferred form, the lower condenser plate is a cylinder or roller. The bottom screen of the hopper is curved and standing opposite the roller and spaced therefrom to provide an air gap. An endless screen band is placed over the cylindrical condenser plate and another cylinder or roller with its axis of rotation parallel to the axis of rotation of the cylindrical condenser plate.

Since the hollow spaces of the screen band fulfill on the cylindrical condenser plate the conditions of a Faraday cage, only those fibers which protrude outwardly beyond the surface of the screen band out into the field can jump back into the field from the surface of the cylindrical condenser. The others lose their charge and remain on the electrically grounded roller surface until they are removed by a stripper and collected. The fibers protruding outwardly beyond the surface of the screen band move again to the charged screen bottom and from there back again in constant reciprocation through the air gap. If the endless screen band moves steadily in a direction away from the screen bottom of the fiber supply source to the screen bottom of the suction chamber, then, after prior repeated jumping back and forth, these long fibers are sucked through the screen bottom into the suction draw-off chamber and are conveyed away.

In the invention, the sorting according to fiber length can take place only upwardly, i.e., a group of longer fibers of various lengths are separated from a group of shorter fibers of various lengths in one sorting operation. This, however, is not a serious problem because it is possible with ease to use successive stages of the sortings in such a way that first the statistically determined smallest lengths, then a next group, etc. stepped in ranges as narrow as desired, are sorted out progressively. In this manner it is possible according to the process of the invention to obtain a very well sorted flock which can be used to produce a faultless, flocked surface.

It is also possible to proceed, for example, in a type of cascade sorting in a downward direction wherein, first, the fibers of lengths lying above the upper limit are sorted out, then the fiber mixture remaining is brought to the next stage, where the next longest fiber lengths are separated, etc. until finally as residue only the fibers remain which, because of their shortness, are unuseable.

With the aid of the accompanying drawings, the preferred forms of the invention are explained in greater detail.

In the drawings:
FIG. 1 is a side elevation of a flock sorter.
FIG. 2 is a front elevation thereof in partial section.
FIG. 3 is a schematic representation of the sorting process.
FIG. 4 is a diagrammatic view of parts of the screen section of the flocking box, a condenser plate and moving screen section in accord with another embodiment.
FIG. 5 is a diagrammatic view of still another embodiment of the invention.
FIG. 6 is a diagrammatic view of a flock sorter useful in batch sorting of fiber length, especially for sortings of relatively small amounts of fiber flocks.

On the upper part 1 of the sorter frame, a fiber supply hopper 3 is mounted. The lower end of the hopper is attached by a vibrating screen 4 to the shaft 5. The shaft issues into the flocking box consisting of the divided halves 6 and 7, the bottom of which flocking box is a curved screen 8. The curve of the screen 8 corresponds with the cylindrical surface of the roller 9 such that the air gap distance therebetween is substantially uniform. The roller 9 rotates on the shaft 10, which is mounted on the lower part 2 of the frame. A roller 11, rotatably journalled by shaft 12, in turn supported on the biasing devices, each consisting of spring 13, bolt 14, bar 15 and nuts 16, can be shifted on a straight line which cuts the axes of shafts 10 and 12 perpendicularly to endless screen band 17.

The endless screen band 17, extending about and between rollers 9 and 11 with the aid of screen support structure on the roller 9, is raised relative to the main, cylindrical surface of the roller 9 to such an extent that the distance between the outer surface of screen band 17 and the cylindrical surface of roller 9 corresponds to the approximate maximum length of the shorter fibers to be sorted out. The suction chamber of half 7 of the flocking box is preferably connected by a pipe 23 with a suction draw-off device 41.

If, for example, the flock mixture to be sorted out is placed in the hopper 3 and the vibrating screen 4 driven by the vibrator 24 is charged with a high voltage of, for example, 60,000 volts, while the portions 18 and 19 of the bottom screen 8 of the flocking box is charged with a high, though lower voltage, e.g., 30,000 volts, then the fibers of the initial fiber mixture, agitated by the vibrating of the charged vibrating screen 4, travel through the part 6 of the flocking box, through the screen section 18 and air gap 20 and perpendicularly against the surface of the cylindrical condenser plate, which is the cylindrical surface of the roller 9. The flocks which do not penetrate the screen 17 to the roller surface, but rather strike the grounded mesh wires of the screen 17, jump back to the screen section 18, or possibly to screen section 19 as explained below.

The fibers which penetrate screen 17 as far as the surface of roller 9 are sorted. Those fibers of short enough length so as not to protrude beyond the surface of the screen 17 are isolated from the electrostatic field in air gap 20 and give up their charge. They move with the screen 17, which moves counterclockwise as viewed in FIG. 1, onward until they drop from screen 17, or roller 9, into collection chute 22.

The fibers protruding beyond the surface of the screen 17, i.e., the fibers which exceed the maximum length, are propelled toward the screen section 18 or 19. In the process, these longer fibers move back and forth until they pass through the meshes of the screen section 19 and into the chamber 7, where they are drawn off with the aid of the suction device 41 through pipe 23.

The rollers 9 is driven by a motor by a gear mechanism, belt drive, or the like (not shown). The sections 6 and 7 of the flocking box may be separate hollow members or a single hollow member divided by a divider wall 25. The high voltage charge on screen 4 is subject to variation among different fiber flocks, but it is ordinarily in the order of 10,000–80,000 volts. The high voltage charge on screen sections 18 and 19 is the same as or a lower voltage, ordinarily in the range of 10,000–80,000 volts. A higher voltage on screen 4 than one screen section 18 is preferred because the fibers are accelerated between the screens and gives better assurance of a trouble-free operation. More important, screen clogging and like difficulties are better avoided under this arrangement. The width of air gap 20 is not of critical essence as long as the gap is sufficiently wide to preclude electrical arcing between the condenser fibers. Screen 17 is spaced by surface 21 of roller 9 by narrow spacer ribs 26 on the surface 21 or other suitable means.

The process is illustrated schematically in FIG. 3. The fiber $F_1$ passing through screen 17 and having lengths approximately equal to or shorter than spacing D lose their charge and remain with screen and roller 9. Fibers $F_2$ which are longer than spacing D continue to move back and forth through air gap 20 between screen section 18 and screen 17 and/or the condenser plate surface 21. Longer fibers $F_3$ striking screen section 19 are repelled back through the air gap, but longer fibers $F_4$ which pass through the screen openings are sucked away through chamber 7. Any fibers striking screen 17, including shorter fibers $F_5$, are impelled back into the air gap to the charged screen, but ultimately such fibers as $F_4$ and $F_5$ will pass through the screen openings of screens 19 and 17, respectively, and will thus be sorted.

It is self-evident that the apparatus may, if need be, also be constructed in such a way that the grounded screen band 17 is drawn in spaced relation over a flat, grounded, condenser plate, in which arrangement then, correspondingly the screen sections 18, 19 are likewise flat and lie parallel with the surface of the condenser plate.

The lateral displacement of the fibers in continuous operation can also be achieved or promoted according to the invention by having the oppositely situated condenser surfaces which diverge in the direction of movement of the fibers. The fibers then have a tendency, to be sure, to move in the field lines, but the arising acceleration forces result in the effect that the actual fiber trajectories have a greater mean radius than the field lines.

The above alternative is illustrated digrammatically in FIG. 4. In FIG. 4, the grounded condenser plate 27 is a flat plate over which travels in predetermined, uniform spaced relationship thereto the flat screen 28, also grounded. The condenser plate 27 may be stationary or may move linearly with the screen 28. The flat screen 28 advantageously may be the flat portion or flight of an endless screen band mounted on drive rollers as aforedescribed in reference to screen band 17.

The screen 28 travels beneath a flocking box of the character previously described except that screen sections 18' and 19' are flat instead of curved. The screen sections 18' and 19' may be substantially parallel with screen 28 to provide a uniform spacing therebetween, as aforedescribed, or, as in the illustrated case in FIG. 4 screen sections 18' and 19' may diverge from screen 28 in the direction of travel of the latter screen to promote lateral displacement.

As a further alternative, the screen 28 may be stationary. In this arrangement, the fibers jumping back and forth still move in the arrow direction shown in FIG. 4 as a result of the effect upon the fiber trajectories by the field between the diverging screens.

Still another embodiment is shown in FIG. 5 wherein a grounded, flat, condenser plate 30 covered by a grounded, spaced, flat screen 31 are disposed opposite the flat screen sections 18' and 19' of the flocking box sections 6 and 7. The movement of fibers, as they jump back and forth, in the arrow direction is promoted by providing a third condenser plate 32 at the end of the field toward which the fibers are to move. The condenser plate 32 is switched in parallel with one of the condenser screens 18' and 19' or the condenser plate 30 in a way that the plate 32 acts at or nearly at a right angle to the field lines of the field between the screens 18' and 19' and the condenser plate 30 and screen 31. Condenser plate 32, therefore, may be electrically connected with the charged screens 18' and 19' by electrical connection 33 or with condenser plate 30 or screen 31 by the alternate electrical connection 34. The surface 35 of condenser plate 32 which faces the field forms an angle of at least 90° with the plane of the condenser member 18' and 19' or condenser member 30 and/or 31 to which it is connected electrically. The screen 31 may be stationary or may move in the arrow direction.

All of the previously described embodiments are adapted for use in a continuous process for sorting fibers of various lengths. In each case, the fibers to be sorted preferably are supplied to the section 6 of the flocking box in a manner as described in reference to the embodiment of FIGS. 1 and 2, and the longer fibers are sucked out of the section 7 in a similar manner.

The embodiment of FIG. 6 is a simple version of the invention adapted to be used for small, batch type separations. A batch of fibers to be sorted are placed in a flocking box 36 through the top opening 37. The box is connected with a shaking mechanism (not shown) for shaking the box in the arrow directions. The bottom of the box is a screen 38 charged with a high voltage as aforedescribed.

A flat, stationary, grounded condenser plate 39 and a grounded, flat, stationary, cover screen 40 are positioned below the screen 38. The flocking box 36 is shaken periodically. When the box is shaking, fibers emerge through screen 38 and are set in motion as aforedescribed in the field between charged screen 38 and screen 40. The shorter fibers remain with the condenser plate 39 and screen 40 while the longer fibers continue to jump back and forth in the air gap. When the shaking of box 36 is stopped, these longer fibers can re-enter the flocking box through screen 38 and will remain in the flocking box until it is again shaken. This apparatus is useful only for separation of small batches of fibers and is not adapted for large scale, commercial usage.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein disclosed being preferred embodiments for the purpose of illustrating the invention.

The invention is hereby claimed as follows:

1. A process for sorting fibers of different lengths which comprises charging a screen with a high voltage to create an electrostatic field across an air gap between said screen and a grounded condenser surface, providing a second screen, also grounded, in said air gap at a short, predetermined spacing from said surface to form in said spacing an area isolated from the electrostatic field created by said charged screen, feeding fibers of different lengths through said charged screen into said air gap, thereby causing said fibers to move quickly back and forth through said air gap between said charged screen and said grounded members in axial fiber orientations substantially at right angles to said charged screen and said grounded members, the fibers of lengths short enough to be contained at said orientations within said isolated area remaining in said area while the fibers in said orientation which have at least a part thereof in said electrostatic field in said air gap continuing to move back and forth quickly between said charged screen and said grounded members, allowing said fibers to move back and forth a sufficient amount of time until substantially all of the fibers of said lengths short enough have entered and remain in said isolated area, and thereafter removing the remainder of said fibers from said air gap.

2. A process as claimed in claim 1 wherein said fibers projecting into said air gap are caused to move also transversely to the direction of said orientation and removing said remainder of said fibers from said air gap by sucking said last-mentioned fibers into a low pressure zone communicating with said air gap.

3. A process as claimed in claim 2 wherein said fibers are caused to move also transversely to the direction of said orientation by moving said grounded screen transversely relative to said charged screen.

4. A process as claimed in claim 2 wherein said fibers are caused to move also transversely to the direction of said orientation by divergence of said charged screen relative to said grounded screen to provide a progressively widening air gap therebetween.

5. A process as claimed in claim 2 wherein said fibers are caused to move also transversely to the direction of said orientation by providing a condenser surface having an electrical potential substantially the same as one of said charged screens and said grounded members at the end of said air gap adjacent said low pressure zone with the contiguous surface of said last-mentioned condenser at an angle of at least about 90° relative to the plane of said one of said charged screens and said grounded members.

6. A process as claimed in claim 1, wherein said fibers of different lengths are initially charged upon passing through a vibrating screen charged with 10,000–80,000 volts, the charged fibers are accelerated from said vibrating screen to said first-mentioned charged screen, which is charged with a voltage in the range of 10,000–80,000 volts and not greater than the voltage charge on said vibrating screen, and said fibers pass through said charged screen into said air gap.

7. Apparatus for sorting of fibers of different lengths which comprises an enclosure having a screen on one side thereof, means for charging said screen with a high voltage, means for supplying fibers to be sorted to said enclosure, a member outside said enclosure opposite said screen and spaced therefrom to provide an air gap between the screen and the surface of said member opposite said screen, means for grounding said surface, a grounded screen juxtaposed over said surface a distance corresponding to the approximate maximum length of the shorter fibers to be sorted from the remainder of the fibers, and means for imparting lateral movement to fibers jumping back and forth between said charged screen and said grounded members for moving said fibers laterally through said air gap, whereby said shorter fibers remain between said surface and said grounded screen while said remainder of said fibers continue to jump back and forth between said charged screen and said grounded members with lateral movement of said remainder of said fibers.

8. Apparatus as claimed in claim 7, and suction means for removing fibers from said air gap at a zone laterally displaced from said screen of said enclosure.

9. Apparatus as claimed in claim 8 wherein said suction means is a second enclosure laterally adjacent said first-mentioned enclosure, a screen on the side of said enclosure facing said air gap, means for charging said screen with a high voltage, and said second enclosure being maintained at a subatmospheric pressure sufficient to suck said fibers moving back and forth in said air gap out of said air gap through said last-mentioned screen.

10. Apparatus as claimed in claim 8 wherein said member is a grounded, cylindrical roller and said surface is the cylindrical surface of said roller, said grounded screen is an endless screen band, means for rotating said roller and band together across said air gap, and said first-mentioned screen is curved to provide a curved air gap between said screen and said screen band and roller.

11. Apparatus as claimed in claim 10 wherein said curved screen is spaced substantially equidistant at all points from said endless screen band and said cylindrical surface to provide a curved air gap of substantially uniform depth.

12. Apparatus as claimed in claim 10 wherein said curved screen is spaced at progressively greater distances from said screen band and said cylindrical surface in the direction of movement of the latter relative to the former to provide a curved air gap of progressively increasing depth in said direction.

13. Apparatus as claimed in claim 7, a condenser member at the end of said air gap toward which said fibers move laterally, and means electrically connecting said condenser member with one of said charged screen and said grounded members, said condenser member assuming the potential of said one of said screen and members and thereby imparting lateral movement to said jumping fibers by its effect on the electrostatic field in said air gap.

14. Apparatus as claimed in claim 7 wherein said charged screen diverges from said grounded members in the direction of said lateral movement to create an electrostatic field in said gap imparting lateral movement as well as said back and forth movement to said fibers in said air gap.

15. Apparatus as claimed in claim 7, a vibrating screen, means to supply fibers to be sorted to said vibrating screen, means for charging said vibrating screen at a high voltage at least equal to the voltage charge on said screen of said enclosure, and means for introducing charged fibers passing through and accelerated away from said vibrating screen into said enclosure.

References Cited

UNITED STATES PATENTS

| | | | |
|---|---|---|---|
| 1,549,875 | 8/1925 | Horne | 209—127.3 |
| 2,361,946 | 11/1944 | Johnson | 209—127.3 |
| 2,803,344 | 8/1957 | Morrison | 209—127.2 |

FRANK W. LUTTER, *Primary Examiner.*